Dec. 28, 1943.   W. HERTZBERG   2,337,603
METHOD FOR MANUFACTURING BRUSHES
Filed May 7, 1942
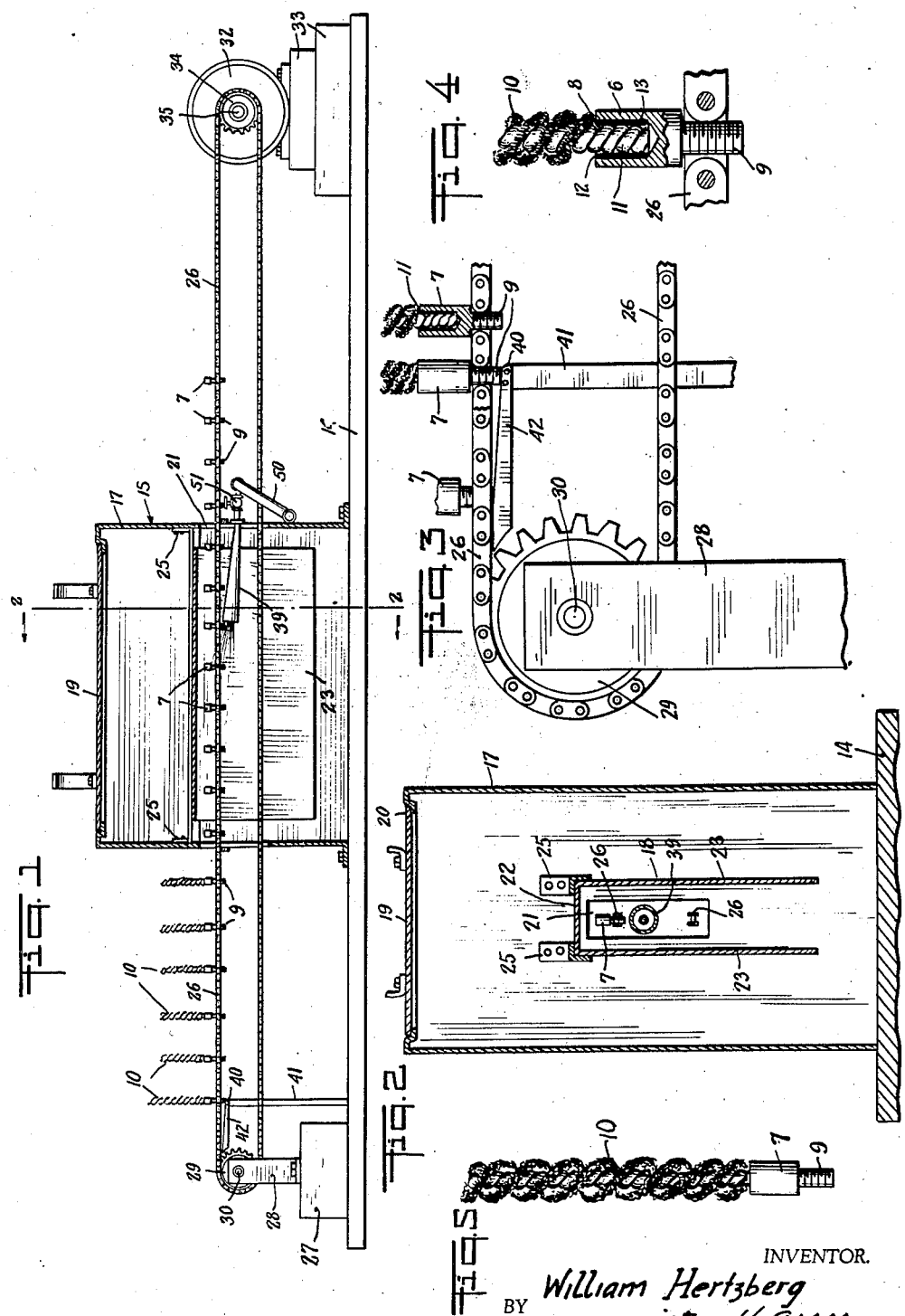
INVENTOR.
BY William Hertzberg
Milton N. Gross.
ATTORNEY Patented Dec. 28, 1943

2,337,603

UNITED STATES PATENT OFFICE 2,337,603

METHOD FOR MANUFACTURING BRUSHES

William Hertzberg, New York, N. Y.

Application May 7, 1942, Serial No. 442,044

1 Claim. (Cl. 300—21)

The present invention relates to an improved method and means for manufacturing brushes and relates more particularly to an improved method and means for manufacturing brushes of the gun bore cleaning type.

Brushes which are employed for cleaning the bores of rifles and other guns of small caliber generally consist of a long rod having a handle positioned at one end and the brush proper positioned at the other end, the brush being removably attached to the rod. The brush itself comprises a series of steel bristles or the like engaged and rigidly held in helical arrangement by a pair of rigidly twisted members or wires which form the shank of the brush. One end of this is in turn held within a chuck or coupling member which permits the removable positioning of the brush on the end of the rod.

The main object of the present invention is to provide an improved method and means for securing the shank of a brush to a coupling member or the like. The aforesaid coupling member or chuck usually consists of a collar portion having its lower end closed and having co-axially depending therefrom a screw or threaded portion which is adapted to engage the threaded portion of the end of the aforementioned rod.

The known method of assembling the brush and the chuck or coupling member is both awkward and laborious, and does not readily lend itself to mass production. The aforesaid method consists in introducing a flux and molten solder into the cavity formed by the collar portion of the chuck and thence inserting the shank of the brush and allowing the assembly to cool. This process requires the provision of a quantity of molten solder and the step of transferring minute quantities of the molten solder from the container holding said solder to the individual chucks without allowing the solder to solidify. This step is difficult, slow and must be conducted with the utmost caution to avoid injury to the operator.

It is therefore another object of the present invention to provide an improved method of assembling a brush and chuck which method is safe, simple and readily adaptable to mass production. The improved method consists primarily in introducing a flux and a pellet of cold solder into the cavity of the chuck, raising the temperature of the chuck and solder until the solder is molten, introducing the shank of the brush into the solder containing chuck and thence allowing the assembly to cool.

Still another object of my invention is to provide an improved means for the continuous assembly of brushes and chucks of the character described.

Other objects of my invention will be set forth in the following description and drawing, which illustrates a preferred embodiment thereof, it being understood that the above statement of the objects of my invention is intended generally to explain the same without limiting it in any manner.

Fig. 1 is a front elevational view of my improved mechanism with the heating chamber shown in section.

Fig. 2 is a sectional view along line 2—2 of Fig. 1.

Fig. 3 is a front detail view of the output end of the mechanism.

Fig. 4 is a front detail view showing the assembled product positioned on the conveyor, said assembled product being partially in section.

Fig. 5 is a front elevational view of the finished product in connection with which my improved means is employed.

Referring to the drawing, 7 designates a chuck or coupling member comprising the upper collar portion 6 having the bore or opening 8 formed therein, the bottom portion of said collar being closed and having a screw or threaded portion 9 depending therefrom. The brush 10 is formed of a pair of wire members 11, said wire members 11 having positioned therebetween wire bristles or the like and being twisted about each other thus imparting the helical arrangement to the bristles. As can be seen in Fig. 4, the twisted wires 11 extend below the lower end of the bristles thus leaving the bristle free lower shank portion 12, which lower shank portion 12 is firmly positioned with the bore 8 of collar 6 by means of solder or the like 13.

The present device comprises essentially a heating compartment and a continuously moving conveyor passing through said heating compartment, said conveyor carrying the chucks 7 containing necessary solder and flux.

Mounted substantially at the middle of the base 14 is the heating compartment 15, said heating compartment 15 comprising the outer insulating chamber 17 and the inner heating chamber 18. The walls of the outer chamber 17 are preferably formed of an insulated material and said chamber has an opening formed in its upper wall which opening is closed by the handle provided lid 19, said lid 19 resting on the inwardly projecting peripheral shoulder 20. Formed in the opposite side walls of the outer chamber are the axially opposed apertures 21, said apertures being just large enough to permit access into the heating chamber of the conveyor, chucks and heating device.

Positioned within the outer chamber 17 and running longitudinally thereof is the heating chamber 18, said chamber 18 consisting of the top wall 22 and the front and rear walls 23, no part of said walls being in contact with the walls of the outer chamber. The inner chamber 18 is suspended in the outer chamber 17 by means of brackets 25, said brackets extending between the side walls of the outer chamber and retaining the inner chamber so that the side openings therein face the openings formed in the side walls of the outer chamber.

A conveyor 26 is provided for the purpose of transporting the chucks 7 through the heating chamber, the said conveyor being formed of a sprocket chain, said sprocket chain having the usual openings therein, defined by the links and pivot pins of said chain. Positioned at the output end of the base 14 is the block 27 on which block are mounted the standards 28. A freely rotatable sprocket wheel 29 is positioned between the standards 28 by means of the axle 30. Situated at the input end of base 14 is the conveyor motivating means 32, said means being mounted on blocks 33 and having sprocket wheel 34 rigidly connected to the drive shaft 35 thereof. The conveyor motivating means 32 may be an electric motor having the usual speed reduction means such as a reducing gear or the like.

The conveyor or sprocket chain 26 is tautly held between the sprocket wheels 29 and 34 and sprocket wheel 34 (as seen in Fig. 1) rotates in a counter-clockwise direction so that the upper length of the conveyor travels from right to left and the lower length from left to right.

The heating means are positioned within the inner chamber 18 at the entrance end thereof and comprises the gas jet 39, valve and air intake chamber 50 and gas conduit 551, said conduit 51 being connected to a source of gas. Jet 39 is so positioned that the flame issuing therefrom envelopes the chuck carrying part of the conveyor and the transported chucks. While I have shown a jet of flame as heating the chucks 7 and melting the contained solder, other means may be substituted therefor, such as an electrical heating coil or a high frequency induction coil through which the chuck carrying conveyor may pass. The temperature of the chamber and the speed of the conveyor should be such that the solder contained in the chucks at the exit end of the heating compartment shall be sufficiently liquefied and that it shall be sufficiently cooled at the terminus of the conveyor.

Positioned immediately ahead of the sprocket wheel 29 is the antifouling device 40, said device comprising the upright 41, having the forwardly projecting arm 42 extending from its upper end. The upper surface of the arm 42 is upwardly inclined towards the sprocket wheel 29 and extends almost to the point of engagement of said sprocket wheel and the sprocket chain 26. The purpose of the antifouling device 40 is to prevent the threaded portions 9 of the chucks 7 from being jammed between the sprocket chain pins and the teeth of the sprocket wheel as will be hereinafter described.

My machine is employed and operates as follows:

The conveyor 26 and the burner 39 are started. Chucks 7 containing the necessary solder and flux are placed on the conveyor so that their threaded portions 9 pass into the apertures formed into said conveyor. The chucks then pass through the heating chamber wherein the solder is melted and as soon as they leave said chamber, the lower shank portions of the brushes are inserted into the collar portions of the chucks and are surrounded by the solder contained within said collar portions. As the assembled products approach the output end of the conveyor, they are sufficiently cooled. Should the threaded portions 9 of the chucks project below the conveyor or sprocket chains as the chucks approach the sprocket wheel 29, the lower ends of said chucks are caused to ride upon the upper inclined surface of the horizontal arm 42, thus elevating the lower ends of said chuck to substantially the lower level of the conveyor. Thereafter, the chucks are ejected from the conveyor by the teeth of the sprocket wheel 29, when said teeth engage the apertures in said sprocket chain thus outwardly forcing the chucks. A container or chute may be positioned around the sprocket wheel 29 to catch the ejected assembled brushes.

I have mentioned placing the solder and flux containing chucks on the conveyor but instead the empty chucks may be placed on the conveyor and the flux and solder thereafter added. I have found that the most convenient method of introducing the cold solder and flux into the chucks is by using a flux containing solder such as a resin cored strip solder and cutting the same into small strips of the necessary amount and inserting a single cut strip into each chuck.

I have shown a preferred embodiment of my invention but it is clear that numerous alterations and omissions can be made without departing from its spirit.

I claim:

A method for the continuous assembly of chucks and brush heads having metallic shanks which comprises continuously moving a chuck containing initially unmolten solder in the cavity thereof through a heated area until said solder is liquefied after said chuck has left said heated area and the solder is still in a molten state, introducing the shank of said brush into said cavity and liquefied solder and continuing the movement of said chuck until the solder has solidified.

WILLIAM HERTZBERG.